US011979732B2

(12) United States Patent
Leppänen et al.

(10) Patent No.: US 11,979,732 B2
(45) Date of Patent: May 7, 2024

(54) GENERATING AUDIO OUTPUT SIGNALS

(71) Applicant: Nokia Technologies Oy, Espoo (FI)

(72) Inventors: Jussi Artturi Leppänen, Tampere (FI); Antti Johannes Eronen, Tampere (FI); Arto Juhani Lehtiniemi, Lempäälä (FI); Miikka Tapani Vilermo, Siuro (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 181 days.

(21) Appl. No.: 17/602,840

(22) PCT Filed: Apr. 20, 2020

(86) PCT No.: PCT/EP2020/060980
§ 371 (c)(1),
(2) Date: Oct. 11, 2021

(87) PCT Pub. No.: WO2020/216709
PCT Pub. Date: Oct. 29, 2020

(65) Prior Publication Data

US 2022/0150655 A1 May 12, 2022

(30) Foreign Application Priority Data

Apr. 23, 2019 (EP) .................................... 19170654

(51) Int. Cl.
*H04R 5/02* (2006.01)
*H04S 7/00* (2006.01)

(52) U.S. Cl.
CPC ............. *H04S 7/30* (2013.01); *H04S 2400/11* (2013.01); *H04S 2400/15* (2013.01); *H04S 2420/03* (2013.01)

(58) Field of Classification Search
CPC .... H04S 7/30; H04S 2400/11; H04S 2400/15; H04S 2420/03
(Continued)

(56) References Cited

U.S. PATENT DOCUMENTS

2013/0177168 A1 7/2013 Inha et al.
2017/0332170 A1 11/2017 Laaksonen et al.
(Continued)

FOREIGN PATENT DOCUMENTS

WO 2012/097314 A1 7/2012
WO 2020/094499 A1 5/2020

OTHER PUBLICATIONS

Office Action received for corresponding European Patent Application No. 19170654.8, dated Feb. 18, 2022, 5 pages.
(Continued)

*Primary Examiner* — Ammar T Hamid
(74) *Attorney, Agent, or Firm* — ALSTON & BIRD LLP

(57) ABSTRACT

An apparatus, method and computer program is described comprising capturing spatial audio data during an image capturing process, determining an orientation of an image capturing device during the spatial audio data capture, generating an audio focus signal from said captured spatial audio data (wherein said audio focus signal is focused in an image capturing direction of said image capturing device), generating modified spatial audio data (e.g. by modifying the captured spatial audio data to compensate for changes in orientation during the spatial audio data capture), and generating an audio output signal from a combination of the audio focus signal and the modified spatial audio data.

20 Claims, 13 Drawing Sheets

(58) Field of Classification Search
USPC .................................................. 381/303, 300
See application file for complete search history.

(56) References Cited

U.S. PATENT DOCUMENTS

| | | | | |
|---|---|---|---|---|
| 2017/0353812 | A1 | 12/2017 | Schaefer | |
| 2017/0359669 | A1 * | 12/2017 | Vilermo | H04R 5/02 |
| 2019/0069083 | A1 | 2/2019 | Salehin et al. | |

OTHER PUBLICATIONS

Extended European Search Report received for corresponding European Patent Application No. 19170654.8, dated Oct. 1, 2019, 8 pages.
International Search Report and Written Opinion received for corresponding Patent Cooperation Treaty Application No. PCT/EP2020/060980, dated May 26, 2020, 13 pages.
Summons to Oral Proceedings received for corresponding European Patent Application No. 19170654.8, dated Sep. 5, 2023, 10 pages.
Intention to Grant for European Application No. 19170654.8 dated Feb. 27, 2024, 9 pages.

* cited by examiner

GENERATING AUDIO OUTPUT SIGNALS

RELATED APPLICATION

This application claims priority to PCT Application No. PCT/EP2020/060980, filed on Apr. 20, 2020, which claims priority to European Application No. 19170654.8, filed on Apr. 23, 2019, each of which is incorporated herein by reference in its entirety.

FIELD

The present specification relates to audio output signals associated with spatial audio.

BACKGROUND

Arrangements for capturing spatial audio are known. However, there remains a need for further developments in this field.

SUMMARY

In a first aspect, this specification provides an apparatus (for example, an imaging device, such as a mobile phone comprising a camera) comprising: means for capturing spatial audio data during an image capturing process; means for determining an orientation of the apparatus during the spatial audio data capture; means for generating an audio focus signal (for example, a mono audio signal) from said captured spatial audio data, wherein said audio focus signal is focused in an image capturing direction of said apparatus; means for generating modified spatial audio data, wherein generating modified spatial audio data comprises modifying the captured spatial audio data to compensate for one or more changes in orientation of the apparatus during the spatial audio data capture; and means for generating an audio output signal from a combination of the audio focus signal and the modified spatial audio data. Some examples include means for capturing a visual image (for example, a still or moving image) of an object or a scene.

In some examples, the spatial audio data is captured from a start time (for example, starting when a photo application is initiated) at or before a start of the image capturing process to an end time at or after an end of the image capturing process.

In some examples, the means for generating modified spatial audio data may be configured to compensate for said one or more changes in orientation of the apparatus by rotating said captured spatial audio data to counter determined changes in the orientation of the apparatus.

In some examples, the spatial audio data may be parametric audio data. The means for generating modified spatial audio data may be configured to generate said modified spatial audio data by modifying parameters of said parametric audio data.

In some examples, the means for generating said audio focus signal may comprise one or more beamforming arrangements.

In some examples, the means for generating said audio focus signal may be configured to emphasize audio (e.g. the captured spatial audio data) in the image capturing direction of the apparatus.

In some examples, the means for generating said audio focus signal may be configured to attenuate audio (e.g. the captured spatial audio data) in directions other than the image capturing direction of the apparatus.

In some examples, the means for generating said audio output signal may be configured to generate said audio output signal based on a weighted sum of the audio focus signal and the modified spatial audio data.

In some examples, the means for determining the orientation of the apparatus comprises one or more sensors (for example, one or more accelerometers and/or one or more gyroscopes).

The means may comprise: at least one processor; and at least one memory including computer program code, the at least one memory and the computer program code configured, with the at least one processor, to cause the performance of the apparatus.

In a second aspect, this specification describes a method comprising: capturing spatial audio data during an image capturing process; determining an orientation of an image capturing device during the spatial audio data capture; generating an audio focus signal (for example, a mono audio signal) from said captured spatial audio data, wherein said audio focus signal is focused in an image capturing direction of said image capturing device; generating modified spatial audio data, wherein generating the modified spatial audio data comprises modifying the captured spatial audio data to compensate for one or more changes in orientation of the image capturing device during the spatial audio data capture; and generating an audio output signal from a combination of the audio focus signal and the modified spatial audio data.

In some examples, the method may further comprise: capturing a visual image of an object or a scene.

In some examples, the spatial audio data is captured from a start time (for example, starting when a photo application is initiated) at or before a start of the image capturing process to an end time at or after an end of the image capturing process.

In some examples, the modified spatial audio data may be generated by compensating for said one or more changes in orientation of the image capturing device. Compensating for said changes in orientation of the image capturing device may comprise rotating said captured spatial audio data to counter determined changes in the orientation of the apparatus.

In some examples, the spatial audio data may be parametric audio data. The modified spatial audio data may be generated by modifying parameters of said parametric audio data.

In some examples, the said audio focus signal may be generated using one or more beamforming arrangements.

In some examples, generating said audio focus signal may comprise emphasizing audio (e.g. the captured spatial audio data) in the image capturing direction of the image capturing device.

In some examples, generating said audio focus signal may comprise attenuating audio (e.g. the captured spatial audio data) in directions other than the image capturing direction of the image capturing device.

In some examples, said audio output signal may be generated based on a weighted sum of the audio focus signal and the modified spatial audio data.

In some examples, the orientation of the image capturing device is determined using one or more sensors (for example, one or more accelerometers and/or one or more gyroscopes).

In a third aspect, this specification describes an apparatus configured to perform any method as described with reference to the second aspect.

In a fourth aspect, this specification describes computer-readable instructions which, when executed by computing apparatus, cause the computing apparatus to perform any method as described with reference to the second aspect.

In a fifth aspect, this specification describes a computer program comprising instructions for causing an apparatus to perform at least the following: capturing spatial audio data during an image capturing process; determining an orientation of an image capturing device during the spatial audio data capture; generating an audio focus signal (for example, a mono audio signal) from said captured spatial audio data, wherein said audio focus signal is focused in an image capturing direction of said image capturing device; generating modified spatial audio data, wherein generating modified spatial audio data comprises modifying the captured spatial audio data to compensate for one or more changes in orientation of the image capturing device during the spatial audio data capture; and generating an audio output signal from a combination of the audio focus signal and the modified spatial audio data.

In a sixth aspect, this specification describes a computer-readable medium (such as a non-transitory computer-readable medium) comprising program instructions stored thereon for performing at least the following: capturing spatial audio data during an image capturing process; determining an orientation of an image capturing device during the spatial audio data capture; generating an audio focus signal (for example, a mono audio signal) from said captured spatial audio data, wherein said audio focus signal is focused in an image capturing direction of said image capturing device; generating modified spatial audio data, wherein generating the modified spatial audio data comprises modifying the captured spatial audio data to compensate for one or more changes in orientation of the image capturing device during the spatial audio data capture; and generating an audio output signal from a combination of the audio focus signal and the modified spatial audio data.

In a seventh aspect, this specification describes an apparatus comprising: at least one processor; and at least one memory including computer program code which, when executed by the at least one processor, causes the apparatus to: capture spatial audio data during an image capturing process; determine an orientation of an image capturing device during the spatial audio data capture; generate an audio focus signal (for example, a mono audio signal) from said captured spatial audio data, wherein said audio focus signal is focused in an image capturing direction of said image capturing device; generate modified spatial audio data, wherein generating the modified spatial audio data comprises modifying the captured spatial audio data to compensate for one or more changes in orientation of the image capturing device during the spatial audio data capture; and generate an audio output signal from a combination of the audio focus signal and the modified spatial audio data.

In an eighth aspect, this specification describes an apparatus comprising: a first audio module configured to capture spatial audio data during an image capturing process; a first control module configured to determine an orientation of an image capturing device during the spatial audio data capture; a second control module configured to generate an audio focus signal (for example, a mono audio signal) from said captured spatial audio data, wherein said audio focus signal is focused in an image capturing direction of said image capturing device; a second audio module configured to generate modified spatial audio data, wherein generating the modified spatial audio data comprises modifying the captured spatial audio data to compensate for one or more changes in orientation of the image capturing device during the spatial audio data capture; and an audio output module configured to generate an audio output signal from a combination of the audio focus signal and the modified spatial audio data.

BRIEF DESCRIPTION OF THE DRAWINGS

Example embodiments will now be described, by way of non-limiting examples, with reference to the following schematic drawings, in which.

DETAILED DESCRIPTION

Figure 1:
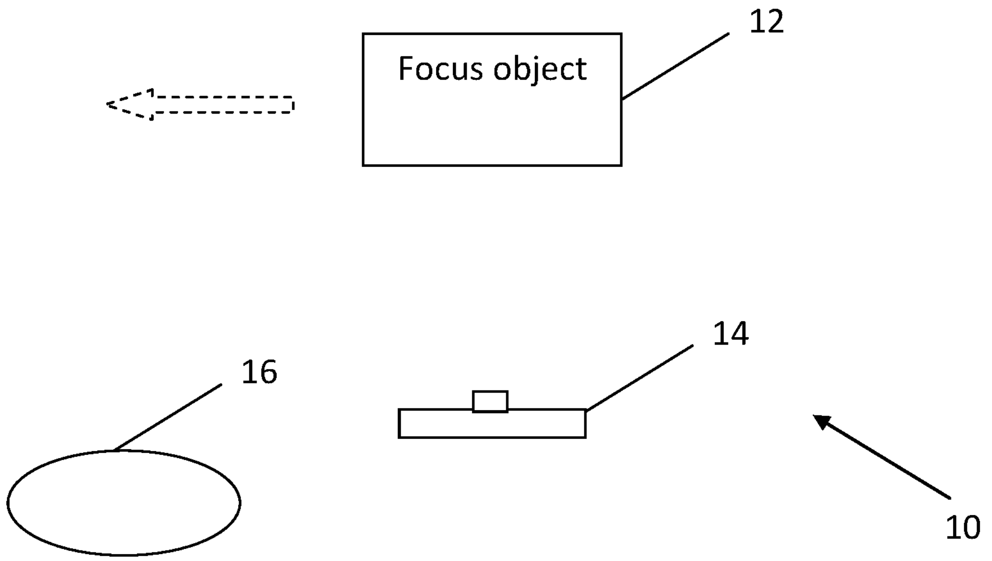
FIGS. 1 to 4 are block diagrams of systems in accordance with example embodiments.

In the description and drawings, like reference numerals refer to like elements throughout.

FIG. 1 is a block diagram of a system, indicated generally by the reference numeral 10, in accordance with an example embodiment. System 10 comprises a focus object 12, an image capturing device 14, and a background object 16. Focus object 12 may be, for example, moving in the left direction as shown by the dotted arrow. The focus object 12 may be any one or more objects in an image capturing direction of the image capturing device 14, such that the image capturing device 14 may be used for capturing one or more images and/or videos of the focus object 12. Background object 16 may represent any one or more background objects that may be present around the image capturing device 14 and/or the focus object 12.

It would be appreciated that the focus object 12 moving in the left direction is merely an example at any time instance, such that the focus object 12 may be moving in any direction, or may also be stationary. Moreover, the "image capturing direction" of the image capturing device 14 may be any direction that is visible to the image capturing device 14 (and not just in front of that device, as shown in FIG. 1).

In an example embodiment, when the image capturing device 14 is being used for capturing an image, the image capturing device 14 also captures spatial audio data. The spatial audio data may comprise focus audio from the focus object 12 as well as background audio from the background object 16. If the focus object 12 is moving, the orientation (e.g. an image capturing direction) of the image capturing device 14 may be changed in order to have the focus object 12 as a focus of the image capture (for example, in a centre of an image capture scene). As the orientation changes, the captured spatial audio data may also change depending on the changes in distance or direction of the focus object 12 and/or the background object 16 relative to the image capturing device 14.

In an example embodiment, the focus object 12 is a moving car, for example in a race, and the image capturing device 14 is a camera or mobile device for capturing an image and/or video of the car. The image capturing device 14 can be held, for example, by a viewer or may be attached to a wall or a tripod. Background object 16 may represent a crowd of people viewing the race. Therefore, the spatial audio data may include sound from the car, as well as the crowd. However, sound from the crowd may be considered to be background audio, while the sound from the car may be considered to be focus audio while capturing an image and/or video of the car.

It will be appreciated that the focus object 12 and the background object 16 are example representations, and are not limited to being single objects, such that they can be any one or more objects or scenes. The focus object 12 may be any object and/or scene in the image capturing direction. The background object 16 may be any object and/or scene in any direction.

Figure 2:
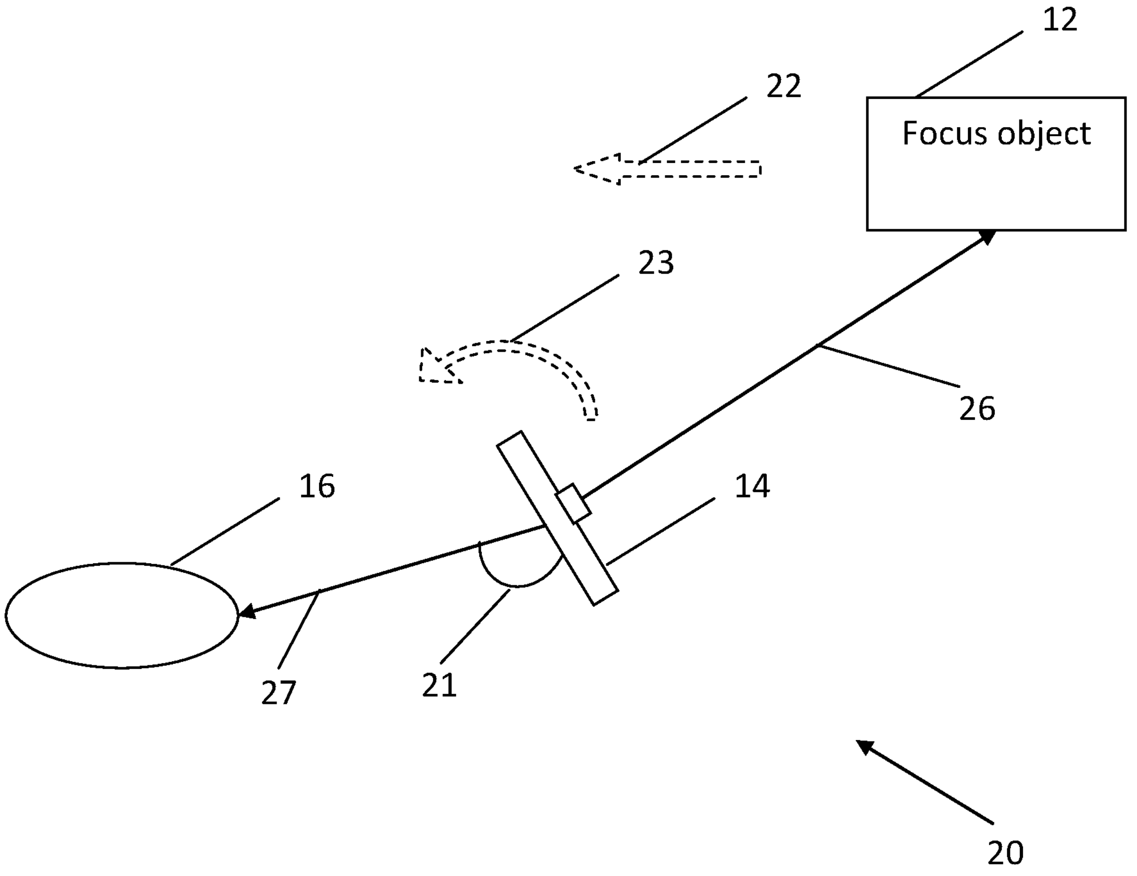
Figure 3:
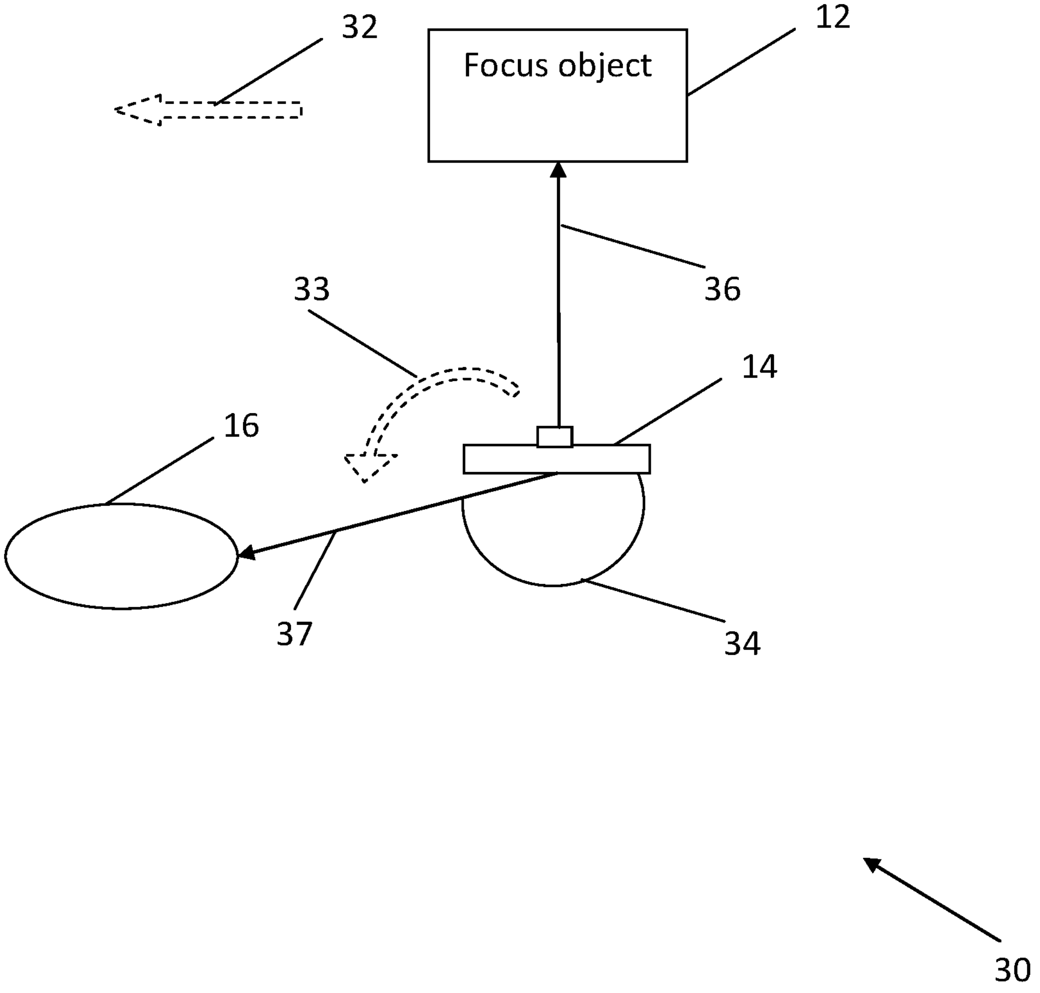
Figure 4:
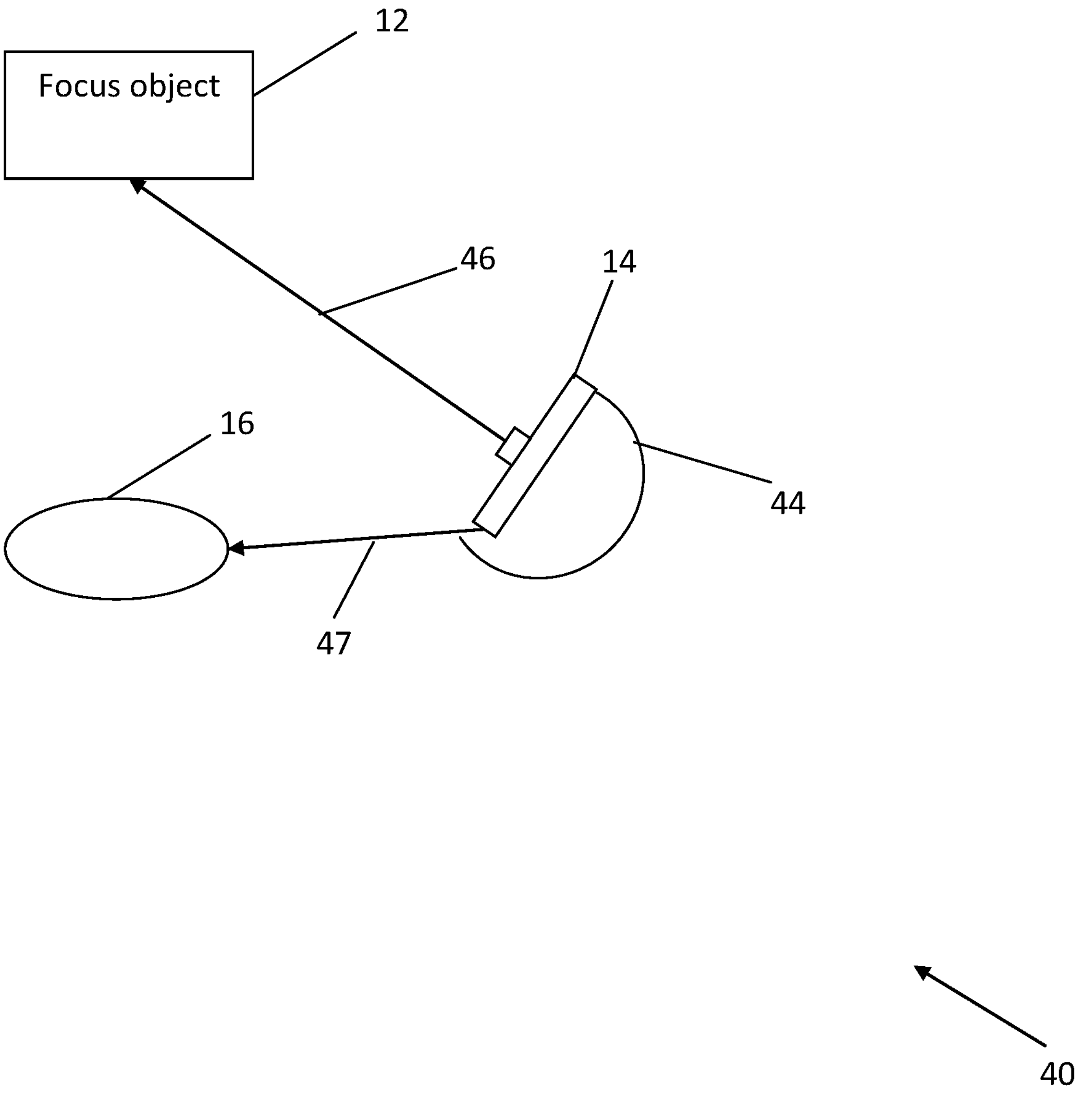

FIGS. 2 to 4 are block diagrams of example systems, indicated generally by reference numerals 20, 30, and 40 respectively. The systems 20, 30 and 40 include the focus object 12, the image capturing device 14 and the background object 16 described above.

The system 20 (FIG. 2) comprises the focus object 12 moving in the left direction shown by a dotted arrow 22, the image capturing device 14, and the background object 16. An orientation of the image capturing device 14 relative to the background object 16 at a first time instance (e.g. at a start time) may be shown by the angle 21. The image capturing direction may be shown by direction 26, and any direction(s) other than the image capturing direction (for purposes of modifying spatial audio) may be shown (byway of example) by direction 27. As the focus object 12 moves in the direction of dotted arrow 22, the orientation of the image capturing device 14 may be changed (e.g. by rotation) in the direction of dotted arrow 23 such that the focus object 12 remains a focus of an image capturing scene.

The system 30 (FIG. 3) comprises the focus object 12, still moving in the left direction (as shown by a dotted arrow 32), the image capturing device 14, and the background object 16. An orientation of the image capturing device 14 relative to the background object 16 at a second time instance may be shown by the angle 34. The image capturing direction may be shown (by way of example) by direction 36, and any direction(s) other than the image capturing direction may be shown by direction 37. As the focus object 12 moves in the direction of dotted arrow 32, the orientation of the image capturing device 14 may be changed in the direction of dotted arrow 33 (e.g. rotated) such that the focus object 12 remains a focus of an image capturing scene.

The system 40 (FIG. 4) comprises the focus object 12, the image capturing device 14, and the background object 16. An orientation of the image capturing device 14 relative to the background object 16 at a third time instance (for example an end time) may be shown by the angle 44. The image capturing direction may be shown by direction 46, and any direction(s) other than the image capturing direction may be shown (by way of example) by direction 47.

Figure 5A:
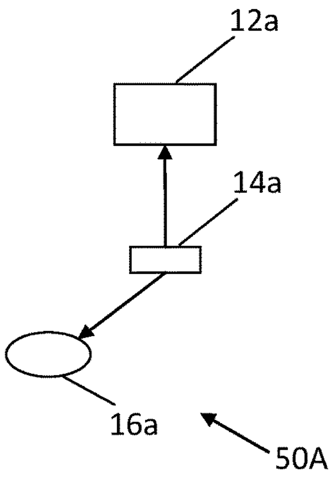
FIGS. 5A, 5B and 5C are block diagrams of systems in accordance with example embodiments.
Figure 5B:
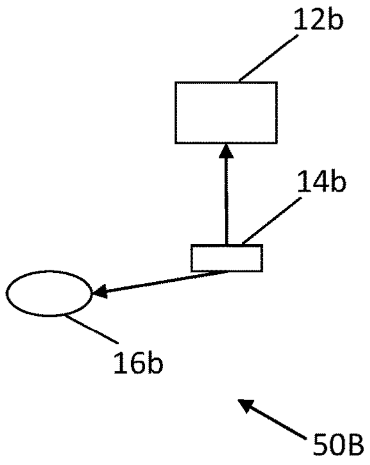
Figure 5C:
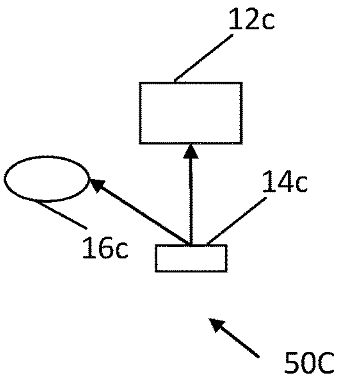

FIGS. 5A, 5B, and 5C are a block diagram of systems, indicated generally by the reference numerals 50A, 50B, and 50C respectively, in accordance with an example embodiment. The systems 50A, 50B, and 50C illustrate how the apparent direction of background audio may change when orientation of an image capturing device 14 is changed for focusing on a focus object 12. The change in the apparent direction of background audio may give a listener the impression that the background object 16 is moving, which may be undesirable (e.g. if the background object 16 is stationary, whilst the focus object 12 is moving).

At a first time instance (e.g. at a start time), shown by the system 50A, the positions of the focus object, image capturing device, and background object are illustrated by focus object 12*a*, image capturing device 14*a* and background object 16*a*. This is the arrangement of the system 20 (FIG. 2) described above.

When the focus object moves in the left direction, the orientation of the image capturing device may change (for example, rotation towards the left direction). At a second time instance, shown by the system 50B, the positions of the focus object, image capturing device, and background object are illustrated by focus object 12*b*, image capturing device 14*b* and background object 16*b*. This is the arrangement of the system 30 (FIG. 3) described above. It can be seen that the direction of the background object 16*b* relative to the image capturing device 14*b* is different in the first time instance and the second time instance.

At a third time instance (the focus object continuing to move in the left direction), shown by the system 50C, the positions of the focus object, image capturing device, and background object are illustrated by focus object 12*c*, image capturing device 14*c* and background object 16*c*. This is the arrangement of the system 40 (FIG. 4) described above. It can be seen that the direction of the background object 16*c* relative to the image capturing device 14*c* is different in the first time instance, second time instance, and third time instance.

Figure 6:
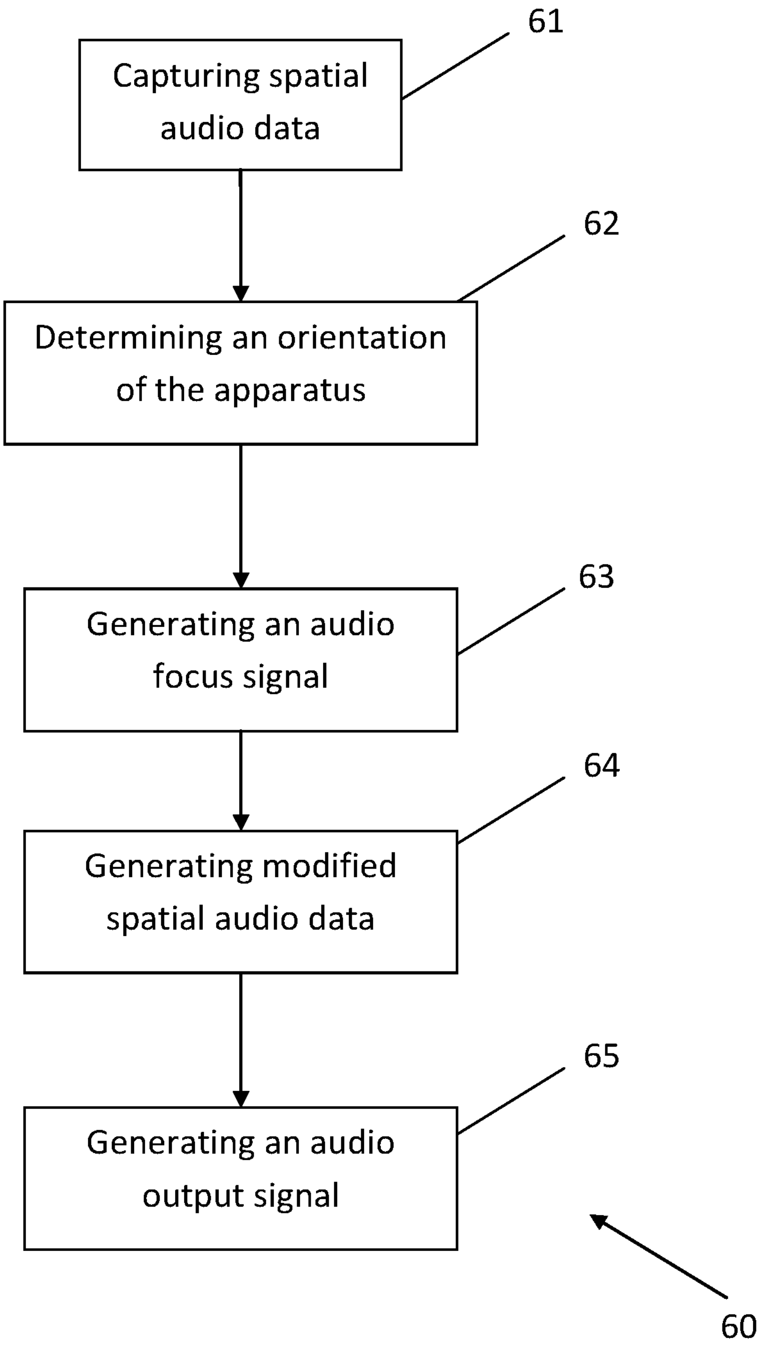
FIG. 6 is a flow chart showing an algorithm in accordance with an example embodiment.

FIG. 6 is a flowchart of an algorithm, indicated generally by the reference numeral 60, in accordance with an example embodiment. FIG. 6 is described in conjunction with FIGS. 2 to 4 and FIGS. 5A to 5C.

At operation 61, a spatial audio data is captured during an image capturing process, for example using the image capturing device 14. Spatial audio data may be captured from the focus object 12 and the background object 16.

At operation 62, an orientation of an apparatus, such as the image capturing device 14, is determined during the spatial audio data capture. The orientation may be determined using one or more sensors (such as accelerometer(s) or gyroscope(s)). For example, in the systems 20, 30, and 40, the orientation of the image capturing device 14 is shown to be changing in an anticlockwise direction (from the direction 26 (angle 21), to the direction 36 (angle 34) and then the direction 46 (angle 44)).

At operation 63, an audio focus signal is generated. The audio focus signal is generated from the captured spatial audio data, and is focused in an image capturing direction. For example, the audio focus signal is focused in direction 26 in the first time instance, direction 36 in the second time instance, and direction 46 in the third time instance. As described further below, the operation 63 may be implemented using a beamforming arrangement.

At operation 64, a modified spatial audio data is generated. The modified spatial audio is generated by modifying the spatial audio data to compensate for changes in orientation during the spatial audio data capture (as discussed in detail below).

At operation 65, an audio output signal is generated from a combination of the audio focus signal and the modified spatial audio data.

In an example embodiment, during the image capturing process, a visual image of an object or a scene may be captured in addition to capturing the spatial audio data.

In an example embodiment, the audio output signal is generated in operation 65 based on a weighted sum of the audio focus signal (generated at operation 63) and the modified spatial audio data (generated at operation 64).

In an example embodiment, the audio focus signal may be focused in the image capturing direction by panning the audio focus signal in the direction of the focus object, in the same direction from where the focus object is heard in the spatial audio data. As such, in the audio output signal, the audio from the moving focus object is perceived to be coming from a moving object and changing based on the actual moving direction of the focus object. In the audio output signal, any audio from background objects is perceived to be from a stationary object, and is configured to be perceived as remaining the same throughout the image capturing process.

In an example embodiment, the spatial audio data is captured at operation 61 from a start time (for example the first time instance) at or before a start of the image capturing process to an end time at or after an end of the image capturing process. For example, in a mobile phone with a camera, the image capturing process and the spatial audio data capture may start when a camera application is active. The image capturing process may end when a user takes a photo. The spatial audio data may, for example, be captured until after a set time after the photo is taken, until the camera application is turned off, or until the mobile phone screen is turned off. In another example, the image capturing process and the spatial audio data capture may start when video capturing is started on a camera application, and the image capturing process and the spatial audio data capture may end when the video capturing is ended.

Figure 7:
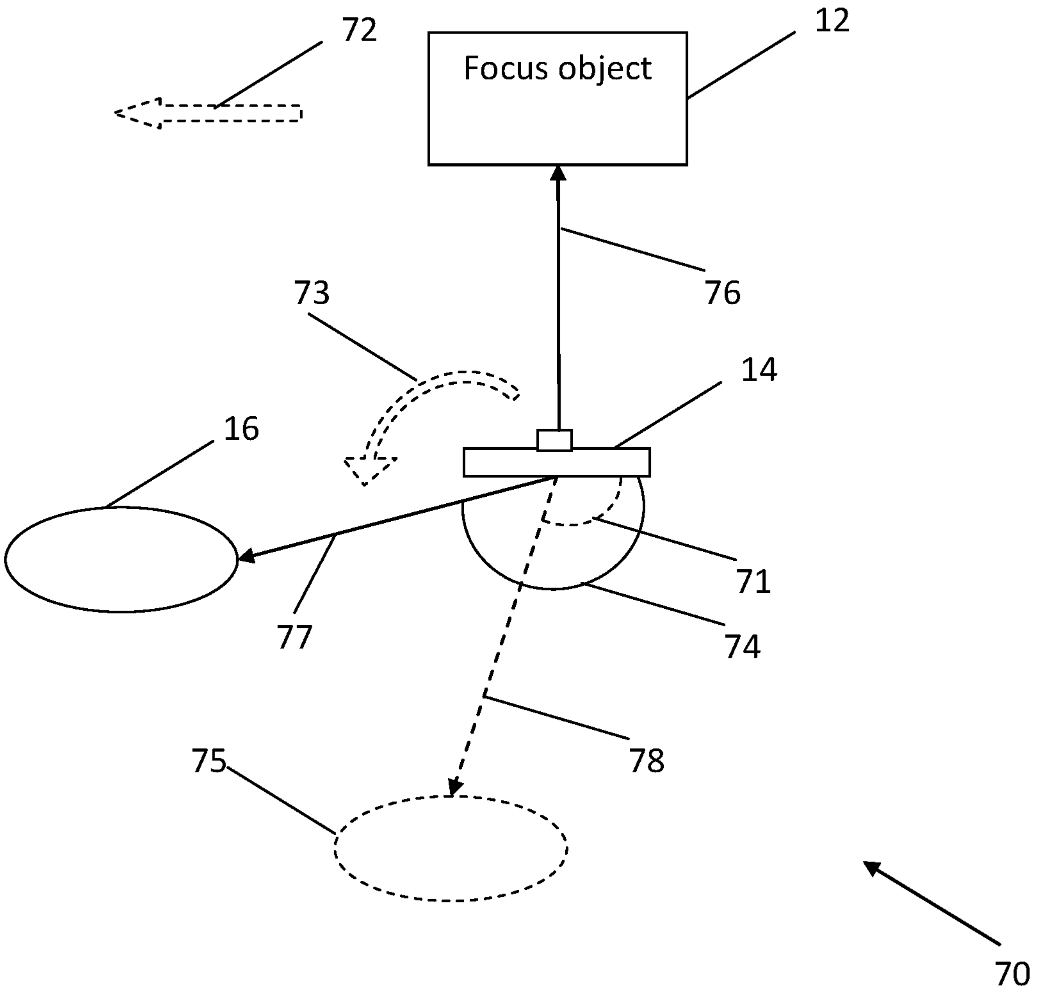
FIGS. 7, 8, 9A, 9B, 9C and 10 to 12 are block diagrams of systems in accordance with example embodiments.
Figure 8:
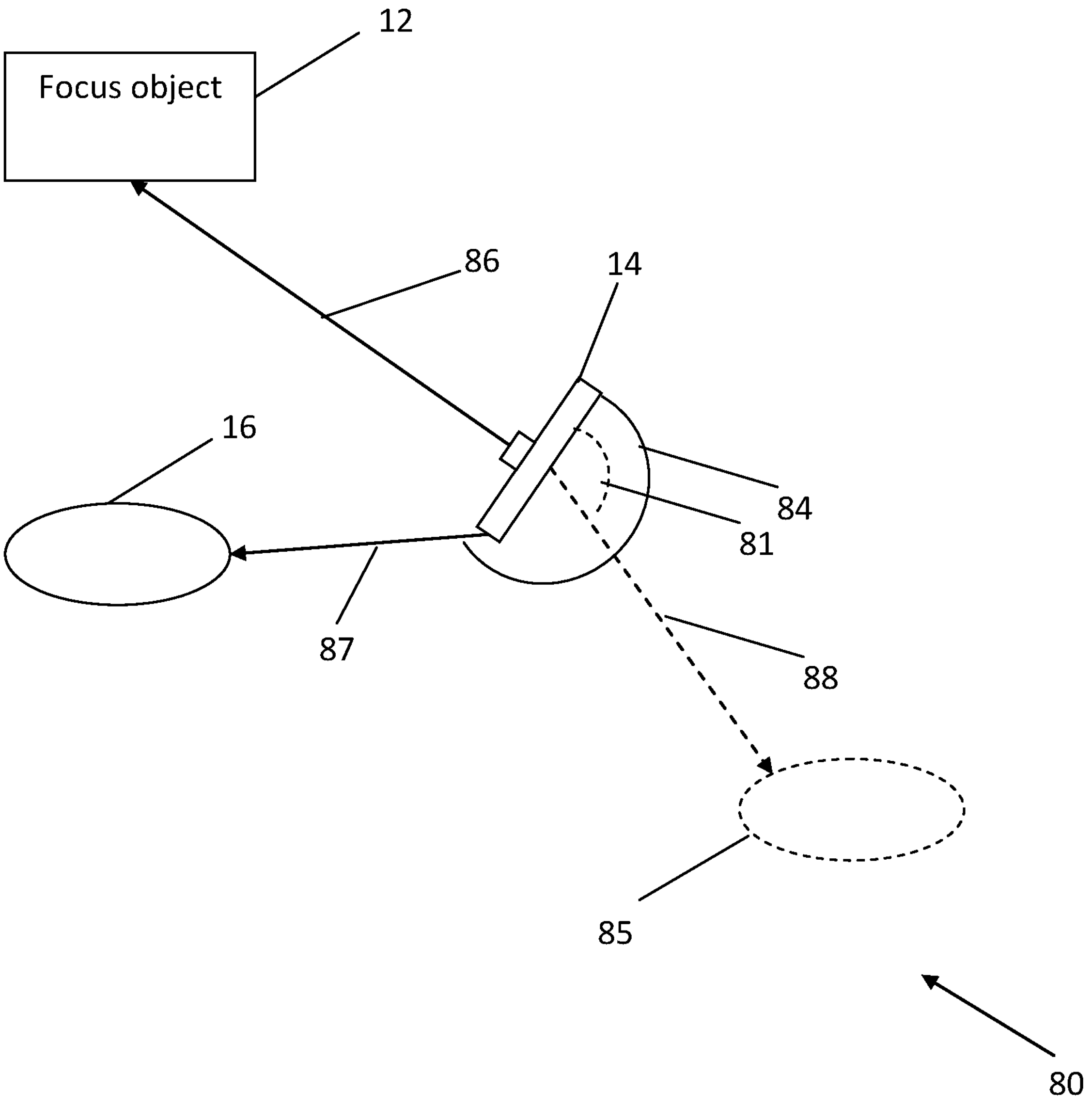

In an example embodiment, at operation 64, the spatial audio data is modified to compensate for changes in orientation by rotating the captured spatial audio data to counter the determined changes in the orientation. For example, in the system 20, a direction (relative to the image capturing device 14) of spatial audio data corresponding to background object 16 (i.e. any spatial audio data excluding the audio focus signal) may be shown by the direction 27. FIGS. 7-9 describe in further detail how the captured spatial audio data may be rotated to counter the determined changes in orientation.

FIG. 7 is a block diagram of a system, indicated generally by the reference numeral 70, in accordance with an example embodiment. The system 70 is similar to the system 30 described above. In the system 70, a direction (relative to the image capturing device 14) of spatial audio data corresponding to background object 16 (i.e. any spatial audio data excluding the audio focus signal) may be shown by the direction 77. However, the change in the orientation compared with the system 20 (shown by angle 74) is compensated for by rotating the direction from direction 77 to direction 78 to counter the determined changes in the orientation. This may allow a listener to perceive that the modified spatial audio data is coming from the direction 78, and that position of the background object 16 is at background object representation 75. The captured spatial audio data may be rotated such that the angle 71 between the image capturing device 14 and the background object representation 75 is substantially same as the angle 21 of the system 20 described above. A listener will thus perceive that the background object is stationary, as the angle 71 is same as the angle 21.

FIG. 8 is a block diagram of a system, indicated generally by the reference numeral 80, in accordance with an example embodiment. The system 80 is similar to the system 40 described above. In the system 80, a direction (relative to the image capturing device 14) of spatial audio data corresponding to background object 16 (i.e. any spatial audio data excluding the audio focus signal) may be shown by the direction 87. However, the change in the orientation (shown by angle 84) is compensated for by rotating the direction from direction 87 to direction 88 to counter the determined changes in the orientation. This may allow a listener to perceive that the modified spatial audio data is coming from the direction 88, and that position of the background object is at background object representation 85. The captured spatial audio data may be rotated such that the angle 81 between the image capturing device 14 and the background object representation 85 is substantially same as the angle 21 described above. A listener will thus perceive that the background object is stationary, as the angle 81 is same as the angle 21.

Figure 9A:
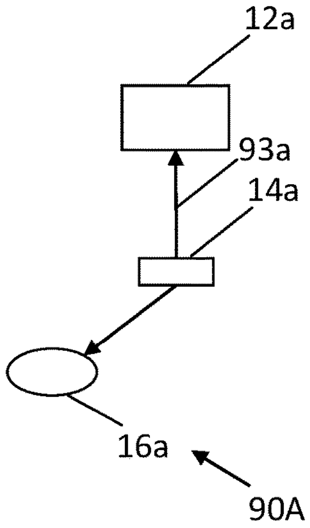
Figure 9B:
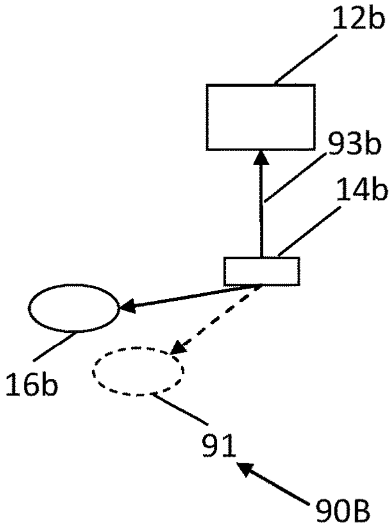
Figure 9C:
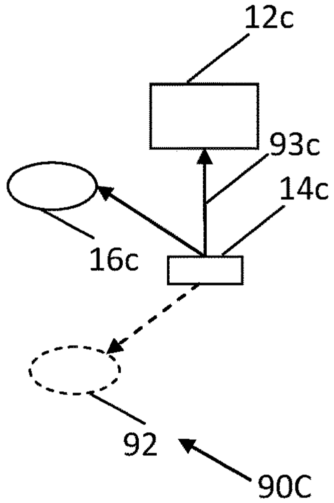

FIGS. 9A, 9B, and 9C are block diagrams of systems, indicated generally by the reference numerals 90A, 90B, and 90C, in accordance with an example embodiment. The systems 90A, 90B, and 90C show the modified spatial audio data and audio focus signal in first, second and third time instances respectively from perspectives such that the focus object is in a centre of an image capturing scene. Similar to the systems 50A, 50B, and 50C, positions of the focus object, image capturing device and background object are illustrated by focus object 12*a*-12*c*, image capturing device 14*a*-14*c*, and background object 16*a*-16*c* in the first, second and third time instances. At a first time instance (e.g. at a start time), shown by the system 90A, the positions of the focus object, image capturing device, and background object are illustrated by focus object 12*a*, image capturing device 14*a* and background object 16*a*. This is the arrangement of the system 20 (FIG. 2), and system 50A (FIG. 5A) described above. In the second time instance, shown by the system 90B, the direction of the spatial audio data is rotated such that the background object is perceived (by a listener) to be in position 91 (the same position as the position 16*a*). In the third time instance, shown by the system 90C, the direction of the spatial audio data is rotated such that the background object is perceived (by a listener) to be in position 92 (again, the same as the position 16*a*). The audio focus signal is focused in an image capturing direction shown by arrows 93*a*, 93*b*, and 93*c* (for example direction of focus object 12 from image capturing device 14).

Figure 10:
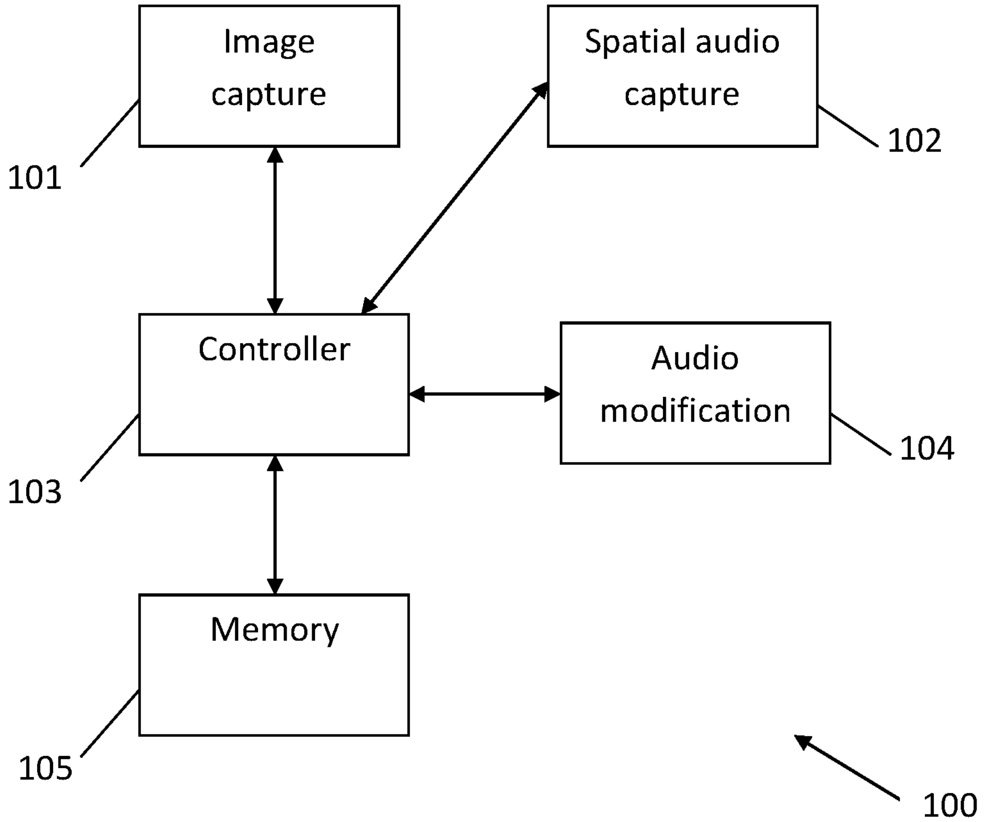

FIG. 10 is a block diagram of a system, indicated generally by the reference numeral 100, in accordance with an example embodiment. The system 100 comprises an image capture module 101, a spatial audio capture module 102, a controller 103, an audio modification module 104 and a memory module 105.

The image capture module 101 is used to capture images (e.g. photographic and/or video images). During the image capturing process, spatial audio data is captured by the spatial audio capture module 102. The captured image data and the captured audio data are provided to the controller 103.

The controller 103 determines an orientation of the apparatus during the spatial audio data capture and uses the audio modification module 104 to modify the captured audio based on orientation data (as described in detail above) to generate modified spatial audio data by modifying the captured spatial audio data to compensate for changes in orientation during the spatial audio data capture. Similarly, the audio modification module 104 generates an audio focus signal, under the control of the controller 103, from the captured spatial audio data, wherein said audio focus signal is focused in an image capturing direction of said image capture module 101.

One or more of the captured spatial audio data, the modified spatial audio data and the audio focus signal may be stored using the memory 105.

Finally, the controller 103 is used to generate an audio output signal from a combination of the audio focus signal and the modified spatial audio data (e.g. by retrieving said data from the memory 105).

In an example embodiment, the spatial audio data captured at operation 61 of the algorithm 60 is parametric audio data. For example, the parametric audio data may be DirAC, or Nokia's OZO Audio. When capturing parametric audio data, a plurality of spatial parameters (that represent a plurality of properties of the captured audio) may be analysed for each time-frequency tile of a captured multi-microphone signal. The one or more parameters may include, for example, the direction of arrival (DOA) parameters and/or ratio parameters such as diffuseness for each time-frequency tile. The spatial audio data may be represented with the spatial metadata and transport audio signals. The transport audio signals and spatial metadata may be used to synthesize a sound field. The sound field may create an audible percept such that a listener would perceive that his/her head/ears are located at a position of the image capturing device.

In an example embodiment, the modified spatial audio data may be generated at operation 64 by modifying one or more parameters of the parametric audio data for rotating said captured spatial audio data to counter determined changes in the orientation of the apparatus. For example, the one or more parameters may be modified by rotating a sound field of the spatial audio data. The sound field may be rotated by rotating the one or more DOA parameters accordingly.

In an example embodiment, the spatial audio data captured at operation 61 of the algorithm 60 is Ambisonics audio such as First Order Ambisonics (FOA) or Higher Order Ambisonics (HOA). The spatial audio data may be represented with transport audio signals. The transport audio signals may be used to synthesize a sound field. The sound field may create an audible percept such that a listener would perceive that his/her head/ears are located at a position of the image capturing device.

In an example embodiment, the modified spatial audio data may be generated at operation 64 by modifying Ambisonics audio data using rotations matrices. Rotation matrices can be used to modify ambisonics audio so that a sound field synthesized from the modified audio data makes a listener perceive that sound sources have rotated around the listener.

In an example embodiment, the audio focus signal may be generated at operation 63 using one or more beamforming arrangements. For example, a beamformer, such as a delay-sum beamformer may be used for the one or more beamforming arrangements. Alternatively or in addition, parametric spatial audio processing may be used to generate the audio focus signal (beamformed output), by emphasizing (or extracting) audio from a focus object from a full spatial audio data.

In an example embodiment, generating said audio focus signal may be configured to emphasize audio (e.g. captured spatial audio data) in the image capturing direction of the apparatus. The audio focus signal may further be configured to attenuate audio (e.g. captured spatial audio data) in directions other than the image capturing direction. For example, in the systems 90A, 90B and 90C, the audio focus signal may be configured to emphasize audio in the image capturing direction, such as direction 93*a*, 93*b* and/or 93*c* respectively. Any audio received from directions other than the image capturing direction, for example from background objects, may be attenuated.

Figure 11:
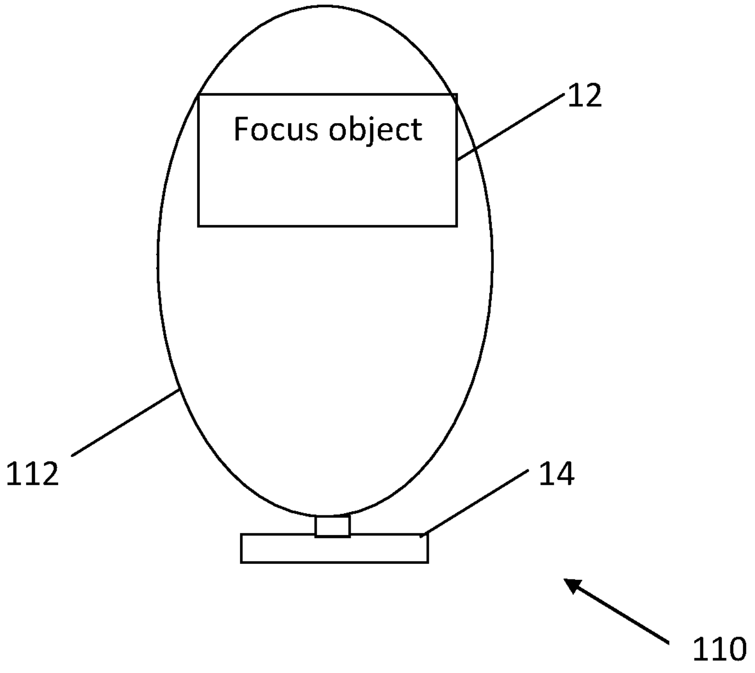

By way of example, FIG. 11 is a block diagram of a system, indicated generally by the reference numeral 110, in accordance with an example embodiment. The system 110 includes the focus object 12 and the image capturing device 14 described above. The system 110 also shows a beamforming arrangement 112 showing an audio focus direction of the image capturing device 14.

Figure 12:
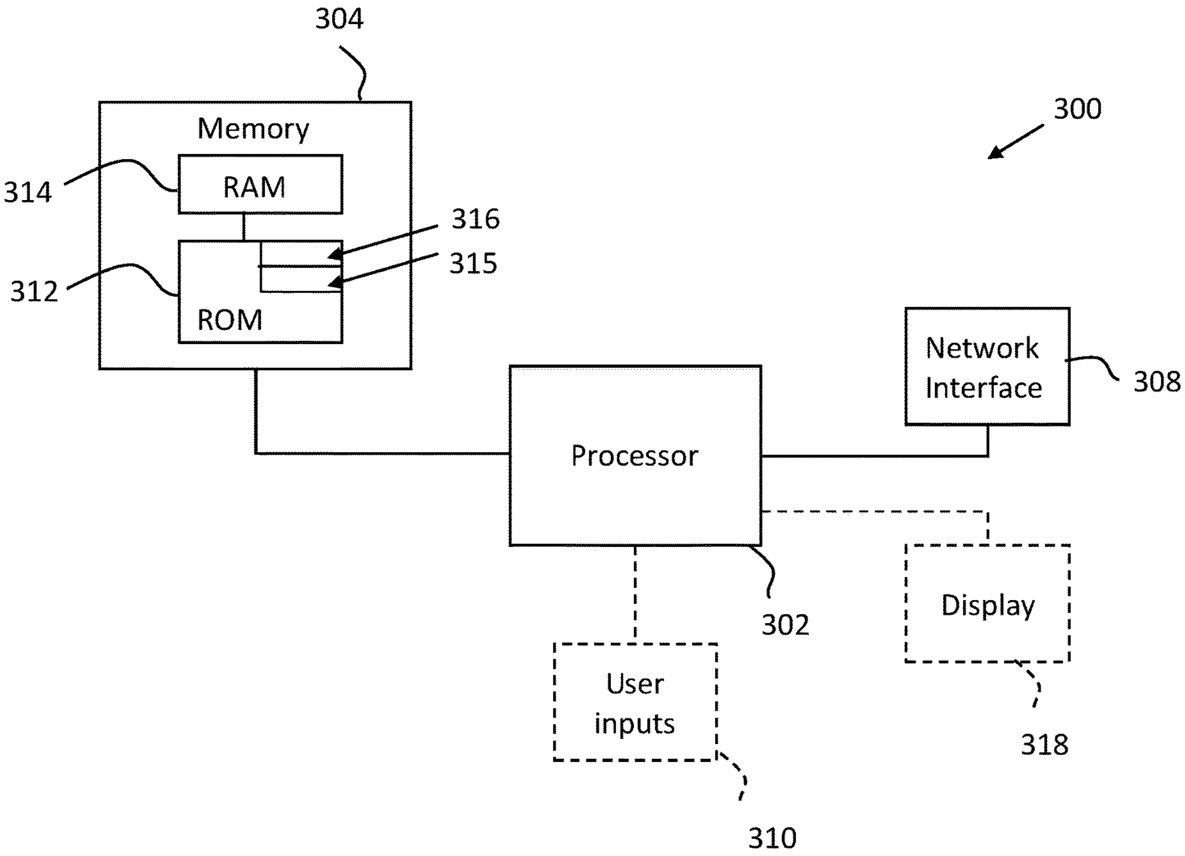

For completeness, FIG. 12 is a schematic diagram of components of one or more of the example embodiments described previously, which hereafter are referred to generically as a processing system 300. The processing system 300 may, for example, be the apparatus referred to in the claims below.

The processing system 300 may have a processor 302, a memory 304 closely coupled to the processor and comprised of a RAM 314 and a ROM 312, and, optionally, a user input 310 and a display 318. The processing system 300 may comprise one or more network/apparatus interfaces 308 for connection to a network/apparatus, e.g. a modem which may be wired or wireless. The interface 308 may also operate as a connection to other apparatus such as device/apparatus which is not network side apparatus. Thus, direct connection between devices/apparatus without network participation is possible.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithm 60 described above. Note that in the case of small device/apparatus the memory can be most suitable for small size usage i.e. not always a hard disk drive (HDD) or a solid state drive (SSD) is used.

The processor 302 may take any suitable form. For instance, it may be a microcontroller, a plurality of microcontrollers, a processor, or a plurality of processors.

The processing system 300 may be a standalone computer, a server, a console, or a network thereof. The processing system 300 and needed structural parts may be all inside device/apparatus such as IoT device/apparatus i.e. embedded to very small size In some example embodiments, the processing system 300 may also be associated with external software applications. These may be applications stored on a remote server device/apparatus and may run partly or exclusively on the remote server device/apparatus.

These applications may be termed cloud-hosted applications. The processing system 300 may be in communication with the remote server device/apparatus in order to utilize the software application stored there.

Figure 13A:
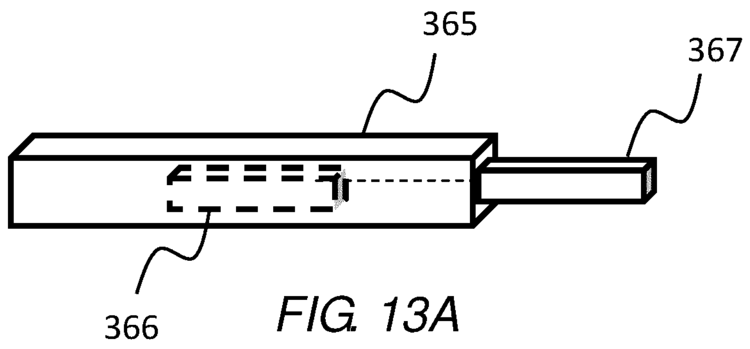
FIGS. 13A and 13B show tangible media, respectively a removable memory unit and a compact disc (CD) storing computer-readable code which when run by a computer perform operations according to embodiments.
Figure 13B:
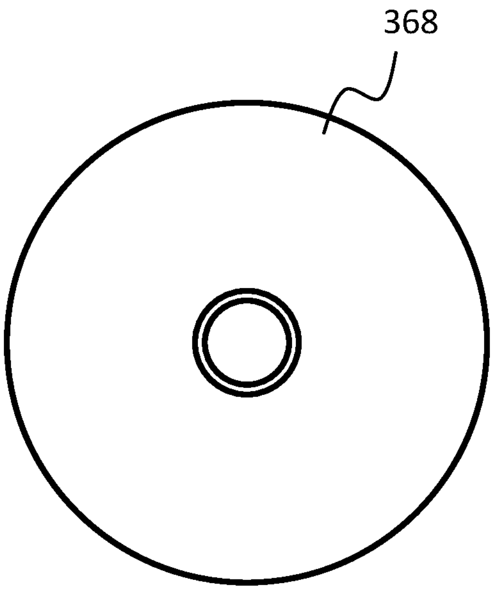

FIGS. 13A and 13B show tangible media, respectively a removable memory unit 365 and a compact disc (CD) 368, storing computer-readable code which when run by a computer may perform methods according to example embodiments described above. The removable memory unit 365 may be a memory stick, e.g. a USB memory stick, having internal memory 366 storing the computer-readable code. The internal memory 366 may be accessed by a computer system via a connector 367. The CD 368 may be a CD-ROM or a DVD or similar. Other forms of tangible storage media may be used. Tangible media can be any device/apparatus capable of storing data/information which data/information can be exchanged between devices/apparatus/network.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices/apparatus and other devices/apparatus. References to computer program, instructions, code etc. should be understood to express software for a programmable processor firmware such as the programmable content of a hardware device/apparatus as instructions for a processor or configured or configuration settings for a fixed function device/apparatus, gate array, programmable logic device/apparatus, etc.

If desired, the different functions discussed herein may be performed in a different order and/or concurrently with each other. Furthermore, if desired, one or more of the above-described functions may be optional or may be combined. Similarly, it will also be appreciated that the flow diagram of FIG. 6 is an example only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described example embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. An apparatus comprising:

at least one processor; and at least one memory including computer program code, the at least one memory and the computer program code configured to, with the at least one processor, cause the apparatus to perform at least the following:

capture spatial audio data, comprising audio from one or more focus objects and one or more background objects, during an image capturing process;

determine an orientation of the apparatus during the spatial audio data capture;

generate an audio focus signal from the captured spatial audio data, wherein the audio focus signal is focused on the one or more focus objects in an image capturing direction of the apparatus;

modify the captured spatial audio data to compensate for one or more changes in orientation of the apparatus during the spatial audio data capture to generate modified spatial audio data, wherein the captured spatial audio data is modified such that a direction of noise produced by the one or more background objects is maintained regardless of the one or more changes in orientation of the apparatus during the spatial audio data capture; and generate an audio output signal from a combination of the audio focus signal and the modified spatial audio data.

2. The apparatus as claimed in claim 1, wherein the spatial audio data is captured from a start time at or before a start of the image capturing process to an end time at or after an end of the image capturing process.

3. The apparatus as claimed in claim 1, wherein the generating modified spatial audio data is configured to compensate for the one or more changes in orientation of the apparatus by rotating the captured spatial audio data to counter determined changes in the orientation of the apparatus.

4. The apparatus as claimed in claim 1, wherein the spatial audio data is parametric audio data.

5. The apparatus as claimed in claim 4, wherein the generating modified spatial audio data is configured to generate the modified spatial audio data by modifying parameters of the parametric audio data.

6. The apparatus as claimed in claim 1, wherein the generating the audio focus signal comprises one or more beamforming arrangements.

7. The apparatus as claimed in claim 1, wherein the generating the audio focus signal is configured to emphasize audio in the image capturing direction of the apparatus.

8. The apparatus as claimed in claim 1, wherein the generating the audio focus signal is configured to attenuate the captured spatial audio data in directions other than the image capturing direction of the apparatus.

9. The apparatus as claimed in claim 1, wherein the generating the audio output signal is configured to generate the audio output signal based on a weighted sum of the audio focus signal and the modified spatial audio data.

10. The apparatus as claimed in claim 1, further caused to perform capture a visual image of an object or a scene.

11. The apparatus as claimed in claim 1, wherein the determining the orientation of the apparatus comprises use of one or more sensors.

12. A method comprising:

capturing spatial audio data, comprising audio from one or more focus objects and one or more background objects, during an image capturing process;

determining an orientation of an image capturing device during the spatial audio data capture;

generating an audio focus signal from the captured spatial audio data, wherein the audio focus signal is focused on the one or more focus objects in an image capturing direction of the image capturing device;

modifying the captured spatial audio data to compensate for one or more changes in orientation of the image capturing device during the spatial audio data capture to generate modified spatial audio data, wherein the captured spatial audio data is modified such that a direction of noise produced by the one or more background objects is maintained regardless of the one or more changes in orientation of the apparatus during the spatial audio data capture; and generating an audio output signal from a combination of the audio focus signal and the modified spatial audio data.

13. The method as claimed in claim 12, wherein the spatial audio data is captured from a start time at or before a start of the image capturing process to an end time at or after an end of the image capturing process.

14. The method as claimed in claim 12, wherein the generating modified spatial audio data is configured to compensate for the one or more changes in orientation of the apparatus by rotating the captured spatial audio data to counter determined changes in the orientation of the apparatus.

15. The method as claimed in claim 12, wherein the spatial audio data is parametric audio data.

16. The method as claimed in claim 15, wherein the generating modified spatial audio data is configured to generate the modified spatial audio data by modifying parameters of the parametric audio data.

17. The method as claimed in claim 12, wherein the generating the audio focus signal comprises one or more beamforming arrangements.

18. The method as claimed in claim 12, wherein the generating the audio focus signal is configured to emphasize audio in the image capturing direction of the apparatus.

19. The method as claimed in claim 12, wherein the generating the audio focus signal is configured to attenuate the captured spatial audio data in directions other than the image capturing direction of the apparatus.

20. A non-transitory computer readable medium comprising program instructions stored thereon for performing at least the following:

capturing spatial audio data, comprising audio from one or more focus objects and one or more background objects, during an image capturing process;

determining an orientation of an image capturing device during the spatial audio data capture;

generating an audio focus signal from the captured spatial audio data, wherein the audio focus signal is focused on the one or more focus objects in an image capturing direction of the image capturing device;

generating modified spatial audio data, wherein generating modified spatial audio data comprises modifying the captured spatial audio data to compensate for one or more changes in orientation of the image capturing device during the spatial audio data capture;

modifying the captured spatial audio data to compensate for one or more changes in orientation of the image capturing device during the spatial audio data capture to generate modified spatial audio data, wherein the captured spatial audio data is modified such that a direction of noise produced by the one or more background objects is maintained regardless of the one or more changes in orientation of the apparatus during the spatial audio data capture; and generating an audio output signal from a combination of the audio focus signal and the modified spatial audio data.

* * * * *